(12) United States Patent
Hoffjann et al.

(10) Patent No.: US 7,659,015 B2
(45) Date of Patent: Feb. 9, 2010

(54) COMBINED FUEL CELL SYSTEM

(75) Inventors: Claus Hoffjann, Hamburg (DE);
Hansgeorg Schuldzig, Jork (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 11/625,410

(22) Filed: Jan. 22, 2007

(65) Prior Publication Data
US 2007/0172707 A1    Jul. 26, 2007

Related U.S. Application Data

(60) Provisional application No. 60/760,460, filed on Jan. 20, 2006.

(30) Foreign Application Priority Data

Jan. 20, 2006   (DE) ................. 10 2006 002 882

(51) Int. Cl.
H01M 12/00    (2006.01)
H01M 8/04     (2006.01)
(52) U.S. Cl. .................. 429/9; 429/19; 429/26
(58) Field of Classification Search ........... 429/9, 429/30, 26, 19
See application file for complete search history.

(56) References Cited

U.S. PATENT DOCUMENTS

| 4,622,275 | A | * | 11/1986 | Noguchi et al. ............. 429/19 |
| 5,558,303 | A | * | 9/1996 | Koethe et al. .......... 244/134 R |
| 5,946,917 | A | * | 9/1999 | Hums et al. ................. 60/723 |
| 6,391,485 | B1 | * | 5/2002 | Perry ........................ 429/13 |
| 6,641,084 | B1 | | 11/2003 | Huber et al. |
| 6,834,831 | B2 | | 12/2004 | Daggett |
| 7,063,905 | B2 | * | 6/2006 | Menon et al. ................ 429/17 |
| 2004/0043276 | A1 | * | 3/2004 | Hoffjann et al. ............. 429/34 |
| 2004/0197617 | A1 | * | 10/2004 | Kaupert et al. .............. 429/19 |
| 2005/0022550 | A1 | * | 2/2005 | Yoshii et al. ................ 62/438 |
| 2005/0175869 | A1 | * | 8/2005 | Blanchet et al. ............. 429/20 |
| 2005/0253706 | A1 | * | 11/2005 | Spoltore et al. ......... 340/539.14 |
| 2005/0266287 | A1 | * | 12/2005 | Hoffjann et al. ............. 429/26 |
| 2006/0199052 | A1 | * | 9/2006 | Miyata et al. ............... 429/22 |
| 2007/0158500 | A1 | * | 7/2007 | Sridhar et al. ............ 244/118.5 |
| 2007/0245751 | A1 | * | 10/2007 | Kulcke et al. ................ 62/91 |
| 2008/0001026 | A1 | * | 1/2008 | Hoffjann et al. ............. 244/58 |

FOREIGN PATENT DOCUMENTS

DE    19642939 A1    4/1997

(Continued)

OTHER PUBLICATIONS http://www.staxera.de/SOFC-Technologie-allg.362.0.html, Staxera: SOFC-Technologie (allg.), pp. 1-3, Dec. 11, 2008.

*Primary Examiner*—Patrick Ryan
*Assistant Examiner*—Muhammad Siddiquee
(74) *Attorney, Agent, or Firm*—Christopher Paradies; Fowler White Boggs P.A.

(57) ABSTRACT

A fuel cell system comprises a combination of a first fuel cell of a first type and a second fuel cell of a second type, arranged downstream of the first fuel cell. The anode side of the first fuel cell is coupled with a cathode side of the second fuel cell; allowing the purge gas emanating from the first fuel cell to be fed to the cathode side of the second fuel chamber, rather than to outside air.

30 Claims, 1 Drawing Sheet

FOREIGN PATENT DOCUMENTS

| | | |
|---|---|---|
| DE | 19821952 C2 | 7/2000 |
| DE | 10216710 A1 | 4/2003 |
| DE | 10249588 A1 | 5/2004 |
| DE | 10216361 B4 | 8/2004 |
| DE | 102004058430 A1 | 6/2006 |

* cited by examiner

COMBINED FUEL CELL SYSTEM

RELATED APPLICATIONS

This application claims the benefit of the filing date of U.S. Provisional Patent Application No. 60/760,460, filed Jan. 20, 2006 and of German Patent Application No. 10 2006 002 882.1, filed Jan. 20, 2006, the disclosures of which are hereby incorporated herein by reference.

FIELD OF THE INVENTION

The field relates to a combined fuel cell system, in particular for use in an aircraft, for example in an airplane.

BACKGROUND

It is known to use a fuel cell to generate electricity and output water. Various fuel cell technologies are available having differing strengths and limitations. A proton exchange membrane fuel cell includes fuel cells also known as polymer electrolyte membrane fuel cells and may be of a high temperature type or a low temperature type.

It is generally considered impractical to use solid oxide fuel cells (SOFC) for even ground transportation due to size, weight of SOFC technology and high operating temperatures.

SUMMARY

A fuel cell system comprising a combination of a first fuel cell of a first type and a second fuel cell of a second type, arranged downstream of the first fuel cell, wherein an anode side of the first fuel cell communicates with a cathode side of the second fuel cell.

According to one example, a fuel cell system may comprise a combination of PEMFC (Proton Exchange Membrane Fuel Cell) or high-temperature-PEMFC (HT-PEMFC) and of SOFC (Solid Oxide Fuel Cell), where a purge gas (residual gas to be purged from the anode side of the PEMFC or HT-PEMFC), which purge gas issues from the PEMFC or the high-temperature PEMFC, may not be led, as it is typically, to the air outside the aircraft, but instead, by way of a cooling air stream, may be fed to the cathode side of the SOFC.

One advantage of the fuel cell system is that the first fuel cell may be a low-temperature fuel cell of the type PEMFC, or a fuel cell of the high-temperature PEMFC type.

Another advantage is that a coolant of the first fuel cell may be air.

Another advantage is that the fuel system may draw in coolant air from the environment.

Yet another advantage is that the second fuel cell may be of a high-temperature fuel cell type using heat generated by the first fuel cell, such as a solid oxide fuel cell.

Yet another advantage is that the hydrogen for supplying the first and second fuel cells may be preheated by heat from a solid oxide fuel cell/combustion chamber combination, such as heat from the turbine stage of the second fuel cell.

Hydrogen for supplying the first and second fuel cells may be transformed from liquid to the gas using such heat.

Another advantage is that the exhaust gas from a second fuel cell may be fed to a cooler/heater combination that preheats supplied cabin air in an aircraft with portion of the waste heat of the exhaust gas.

Yet another advantage is that water that is condensed may be utilized in other aircraft systems, such as in a reformer used to generate hydrogen from hydrocarbons. Reformate gas generated by the reformer may be fed to a fuel cell.

Yet another advantage is that an outlet gas stream from the second fuel cell may be fed to a wing de-icing system.

In one example, a fuel cell system includes an electronic sensor technology/control unit that is supplied with energy from an on-board electricity network that regulates the fuel cell system. A battery may be used in the system.

BRIEF DESCRIPTION OF THE FIGURES

The drawings show examples of the present invention, which is not limited to the specific examples as represented in the drawings.

DETAILED DESCRIPTION

Figure 1:
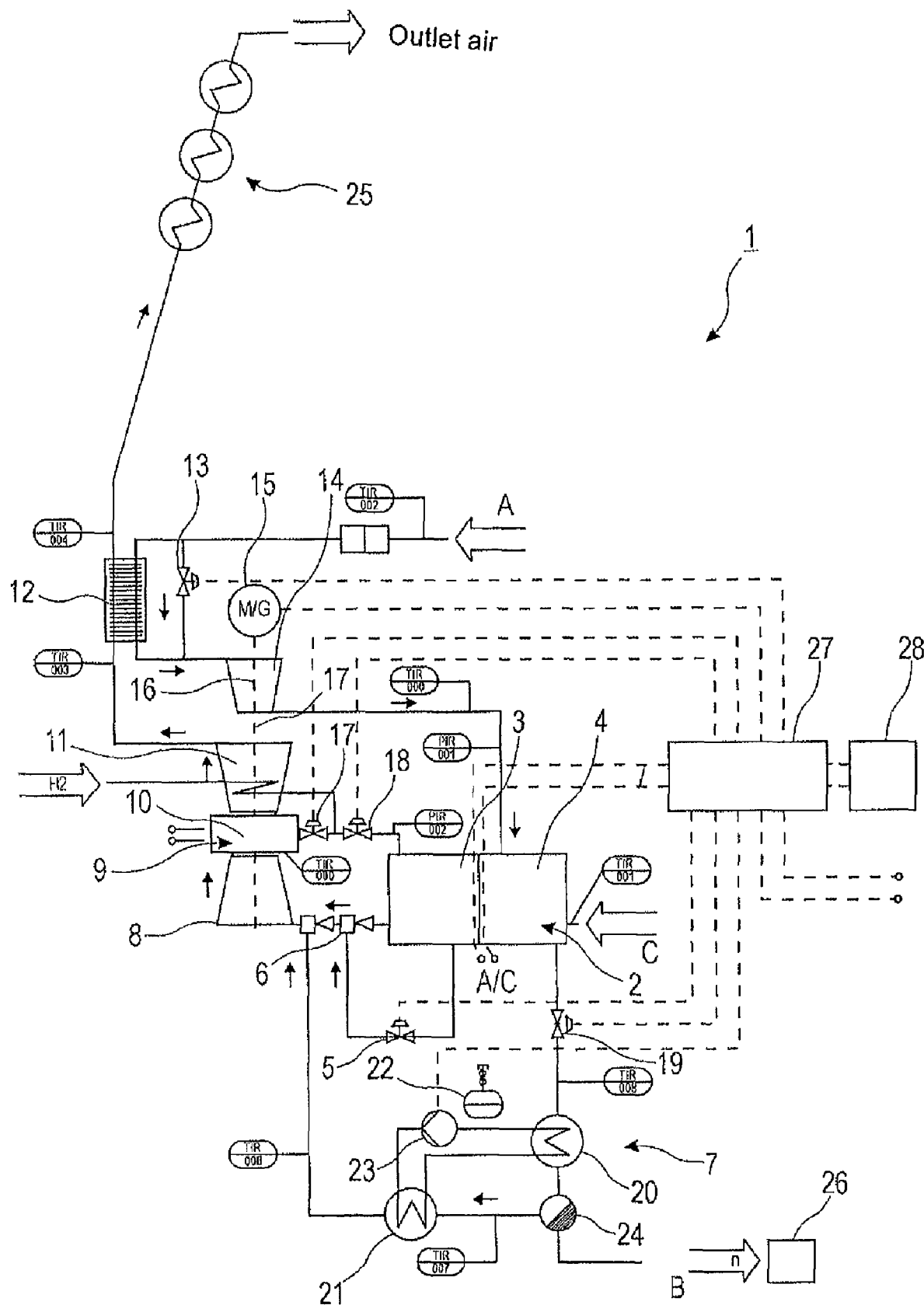
FIG. 1 illustrates an example of a fuel cell system for use in transportation, especially in aircraft.

The examples described and drawings rendered are illustrative and are not to be read as limiting the scope of the invention as it is defined by the appended claims.

A fuel cell system 1, illustrates an example of the invention a first fuel cell 2 using PEMFC technology. An operating temperature range of the PEMFC fuel cell 2 may be selected of about 60 to 80° C. Alternatively, the first fuel cell 2 may be a high-temperature PEMFC, operating in a temperature range of about 120° C. to about 300° C. The first fuel cell 2 comprises an anode 3 and a cathode 4.

A purge gas emanating from the first fuel cell 2 may be fed to an ejector pump 6 by way of a valve 5. The ejector pump 6 adds the purge gas from the first fuel cell 2 to a dry air stream from a cooling circuit 7, which will be described later. Then, the mixed gas stream is fed to a compressor stage 8 which is arranged on the cathode side of a second fuel cell 9 that is located downstream of the first fuel cell 2.

The second fuel cell 9 may be a SOFC, and in particular an SOFC/combustion chamber combination 10. The second fuel cell combination may include a combustion chamber and/or a catalytic burner for the provision of thermal energy. In one example, several combustion chambers are arranged, so as to alternate with SOFC cells, in a ring-shape on a shaft which connects a compressor stage on the cathode side of the second fuel cell to a turbine stage on the anode side of the second fuel cell.

On the anode side, the second fuel cell 9 comprises a turbine stage 11 of a gas turbine. The turbine stage 11 of the gas turbine with the integrated SOFC/combustion chamber combination 10 cools the exhaust gas stream of the SOFC/combustion chamber combination such that said exhaust gas stream can be fed to a precooler 12 where it is used for preheating incoming cabin air A. The exhaust gas from the second fuel cell may be fed to a cooler/heater combination that preheats supplied cabin air A with part of waste heat of the exhaust gas.

The cabin air A may be fed to a compressor 14 by way of the precooler 12 and a bypass valve 13. According to the preferred embodiment, the compressor 14 may be operated by a motor/generator 15 that by way of a shaft 16 may be mechanically coupled to the turbine stage 11 of the second fuel cell 9. The connection between the compressor 14 and the turbine stage 11 of the second fuel cell 9 may be effected mechanically using a coupling or a gear arrangement 17. For example, the compressor is mechanically connected to the compressor stage and to the turbine stage of the second fuel cell. Alternatively, the compressor may be magnetically coupled. The air emanating from the compressor 14 may be fed to the cathode 4 of the first fuel cell 2.

The motor/generator 15 may be used for the purpose of starting the system; it imparts the turbine stage 11 and the compressor stage 8 of the second fuel cell 9 with the angular momentum necessary to start the system. For example, the motor is connected via a shaft. After the system start, the motor 15 may be used as a generator for the purpose of generating electricity.

As shown in the figure, the anode side of the second fuel cell 9 may be supplied with hydrogen by way of a valve 17. In particular, the incoming hydrogen from a reservoir at the turbine stage 11 of the SOFC/combustion chamber combination 10 may be preheated and then, using the valve 17, may be supplied to the anode of the SOFC/combustion chamber combination 10 as well as, using a valve 18, to the anode 3 of the PEMFC fuel cell 2, allowing delivery of the hydrogen fuel cells to be regulated separately.

In one example, the hydrogen for supplying the first and the second fuel cells may be preheated by waste heat from the SOFC/combustion chamber combination. The hydrogen for supplying the first and second fuel cells may be preheated by waste heat of the turbine stage of the second fuel cell. The hydrogen may be stored or condensed as a liquid and may be heated to be supplied as a gas to the fuel cells, for example.

The moist cathode outlet air of the first fuel cell 2 may be cooled by way of a heat pump process, wherein the water contained in the outlet air stream may be condensed out and led away for further use. For example, heat removed from the cathode outlet air may be returned to the cathode outlet air after condensation of water in the cathode outlet air. Moist cathode outlet air may be supplied to the cooling circuit 7 by way of a valve 19.

For example, a cooling circuit 7 comprises two heat exchangers 20, 21, an exchange vessel 22, a venturi nozzle 23 and a condenser 24. Alternatively, the cooling circuit 7 may comprise more, fewer, or other components. In one example, residual gas from the first fuel cell by way of a venturi nozzle may be added to the suction air of a second fuel cell. In another example, cathode outlet air of the first fuel cell that is dried may be added to the suction air of the second fuel cell by way of a venturi nozzle.

According to the embodiment, the water B condensed by the condenser 24 may be fed to a potable water supply system or a service water supply system or to a reformer 26, which may be used to generate hydrogen by reforming hydrocarbons. The reformate gas may then, as an alternative or in addition, be fed to the anode side of either the first or the second fuel cell or both. For example, the reformate gas is fed to the second fuel cell.

In one example, water that is condensed is fed to the reformer. The reformer generates a reformate gas such that hydrogen may be separated from hydrocarbon. The reformate gas may then, as an alternative or in addition, be fed to the first or to the second fuel cell on the anode side. In another example, the reformate gas is fed to the second fuel cell.

As shown in the figure, the outlet air stream of the second fuel cell, which outlet air stream has been cooled down by the precooler 12, may be advantageously fed for further use to a de-icing system 25, which may be, for example, designed such that wing edges of airfoils of an aircraft are heated by the outlet air stream such that icing in flight at any altitude may be prevented.

The entire system may be controlled by an electronic sensor technology-/control unit 27, wherein the latter (as may be the case for the drive for the compressor 14 of the cathode inlet air to the first fuel cell) may be fed from an on-board electricity network of the aircraft, or from a battery 28 or from high-performance capacitors, so-called super caps. The electronic sensor technology-/control may be supplied with energy sources that vary from an on-board electricity network, a battery, a storage battery, a super cap high performance capacitor or any combination. In another example, the sensor technology-/control unit is connected to an independent energy source for starting the system.

The electrical energy generated in the first and in the second fuel cells may be made available, by way of a regulating unit (not shown), to the on-board electricity network of the aircraft.

As shown in the figure (dashed lines) the sensor technology-/control unit 27 serves for energizing or driving the valves 13, 17, 18, 5, 19 as well as the motor 15 and the venturi nozzle 23 and any other components of the system 1. Although examples of the invention has been described above with reference to a preferred embodiment for application in an aircraft, alternative uses of such a fuel cell system are many. Other uses may benefit, especially, where fuel cell systems are used for generating electricity and water. The combination of two different types of fuel cells, as shown by example in an aircraft, provides for reduced weight and improved efficiency compared to known systems.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

Alternative combinations and variation of the examples provided will become apparent based on this disclosure.

LIST OF REFERENCE CHARACTERS

1 System
2 First fuel cell
3 Anode
4 Cathode
5 Valve
6 Ejector pump
7 Cooling circuit
8 Compressor stage
9 Second fuel cell
10 SOFC/combustion chamber combination
11 Turbine stage
12 Precooler
A Cabin air
13 Bypass valve
14 Compressor
15 Motor/generator
16 Shaft
17 Valve
18 Valve
19 Valve
20, 21 Heat exchanger
22 Exchange vessel
23 Venturi nozzle
24 Condenser
25 De-icing system
B Water
26 Potable water-/service water system, reformer
27 Sensor technology-/control unit
28 Battery

The invention claimed is:

1. A fuel cell system comprising: a combination of a first fuel cell of a first type and a second fuel cell of a second type, different than the first type, arranged downstream of the first fuel cell, each fuel cell having an anode side and a cathode side, wherein the anode side of the first fuel cell communicates with the cathode side of the second fuel cell via a compressor, and
    wherein the first fuel cell is a proton exchange membrane fuel cell of the low-temperature type or the high-temperature type.

2. The fuel cell system of claim 1, wherein a coolant of the first fuel cell is air.

3. The fuel cell system of claim 2, wherein the coolant is drawn in from an environment.

4. The fuel cell system of claim 1, wherein the second fuel cell is a high-temperature fuel cell type.

5. The fuel cell system of claim 4, wherein the second fuel cell is a solid oxide fuel cell.

6. The fuel cell system of claim 1, wherein the first fuel cell and the second fuel cell are supplied with hydrogen on the anode side.

7. The fuel cell system of claim 6, wherein the hydrogen for supplying the first fuel cell and the second fuel cell are regulated separately.

8. The fuel cell system of claim 6, wherein the hydrogen for supplying the anode side of each of the fuel cells is preheated by waste heat of a turbine stage of the second fuel cell.

9. The fuel cell system of claim 6, wherein the hydrogen for supplying the anode side of each of the fuel cells may be transformed from a liquid state to a gaseous state.

10. The fuel cell system of claim 1, wherein an exhaust gas from the second fuel cell may be fed to a cooler/heater combination that preheats supplied cabin air using a portion of waste heat from the exhaust gas.

11. The fuel cell system of claim 10, wherein preheated cabin air may be fed to the cathode side of the first fuel cell using a compressor.

12. The fuel cell system of claim 11, wherein the compressor is mechanically connected or magnetically coupled to a compressor stage and to a turbine stage of the second fuel cell.

13. The fuel cell system of claim 12, wherein the compressor is mechanically connected using a coupling or a gear arrangement.

14. The fuel cell system of claim 12, further comprising a motor that is connected by a shaft to the compressor for generating an angular momentum during starting of the system.

15. The fuel cell system of claim 14, wherein the motor is mechanically connected or magnetically coupled to the compressor stage and to the turbine stage of the second fuel cell.

16. The fuel cell system of claim 1, wherein residual gas from the first fuel cell is added to suction air of the second fuel cell using a venturi nozzle.

17. The fuel cell system of claim 1, wherein water contained in cathode outlet air of the first fuel cell condenses out using a cooling circuit.

18. The fuel cell system of claim 17, wherein the cooling circuit comprises a condenser.

19. The fuel cell system of claim 17, wherein the condensed-out water is fed for further utilization to a water system or to a reformer that produces hydrogen from hydrocarbon.

20. The fuel cell system of claim 19, wherein hydrogen produced from the hydrocarbon using the reformer is fed to the second fuel cell.

21. The fuel cell system of claim 17, wherein the outlet air of the cathode of the first fuel cell after condensing out the water is added to suction air of the second fuel cell using a venturi nozzle.

22. The fuel cell system of claim 17, wherein the cooling circuit uses a heat pump process and the heat produced by the heat pump process is transferred to outlet air of the cathode side of the first fuel cell.

23. The fuel cell system of claim 1, wherein a cooled-down exhaust gas stream from the second fuel cell is fed to a wing de-icing system.

24. The fuel cell system of claim 1, further comprising an electronic sensor technology-/control unit for regulating the system.

25. The fuel cell system of claim 24, wherein the sensor technology-/control unit is supplied with energy from an on-board electricity network.

26. The fuel cell system of claim 24, further comprising an independent energy source, connected to the sensor technology-/control unit, for starting the system.

27. The fuel cell system of claim 26, wherein the energy source is a battery, a storage battery and/or a super cap high-performance capacitor.

28. An aircraft using the fuel cell system of claim 1.

29. The fuel cell system of claim 1, wherein the second fuel cell is a combination of a combustion chamber and a catalytic burner providing thermal energy.

30. The fuel cell system of claim 1, wherein the second fuel cell is a combination of a combustion chamber and a solid oxide fuel cell.

* * * * *